Nov. 27, 1934.　　　　W. H. BISHOP　　　1,981,897
BODY FOR MOTOR VEHICLES
Filed July 9, 1932　　　4 Sheets-Sheet 1
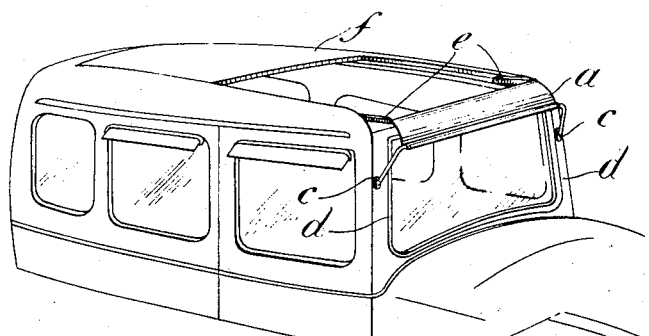
Fig. 1.
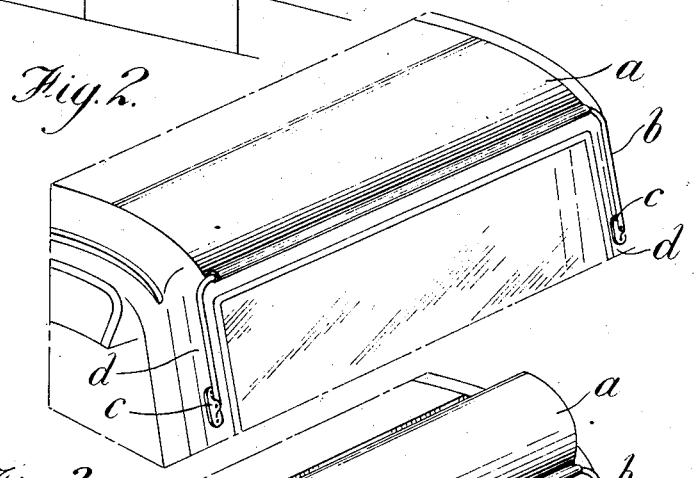
Fig. 2.
Fig. 3.
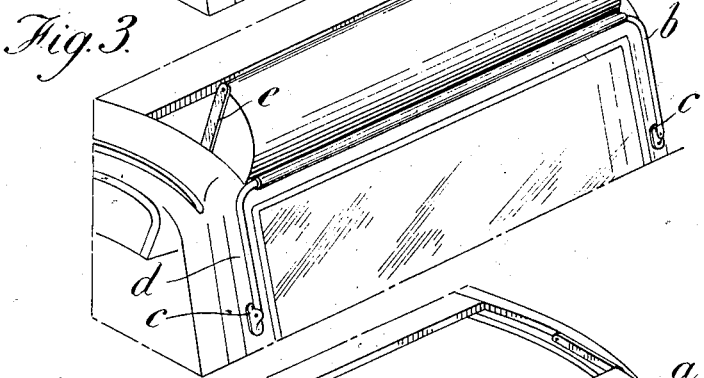
Fig. 4.
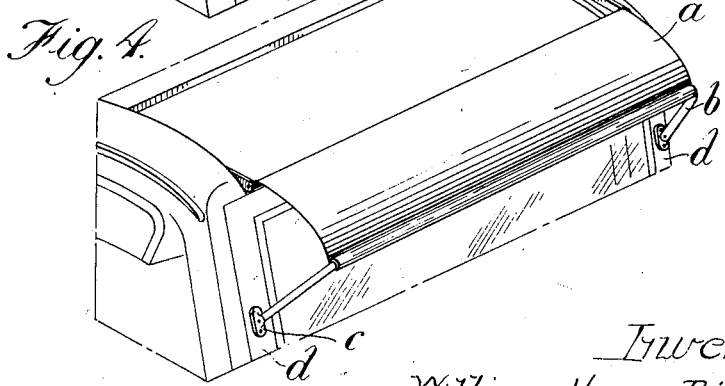
Inventor
William Henry Bishop
By Arthur Wm Nelson
Atty.

Nov. 27, 1934. W. H. BISHOP 1,981,897
BODY FOR MOTOR VEHICLES
Filed July 9, 1932 4 Sheets-Sheet 2
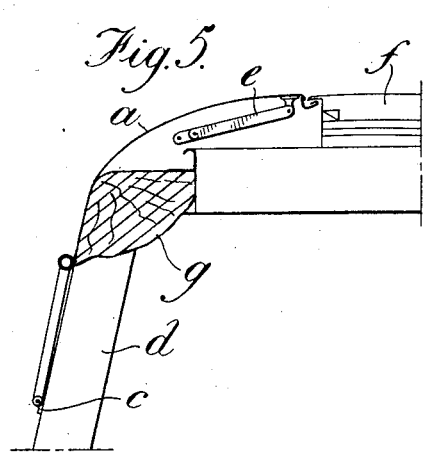
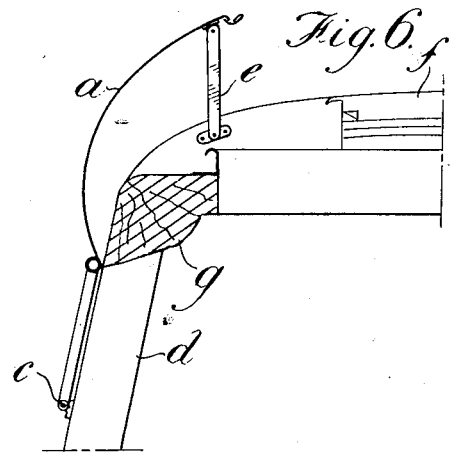
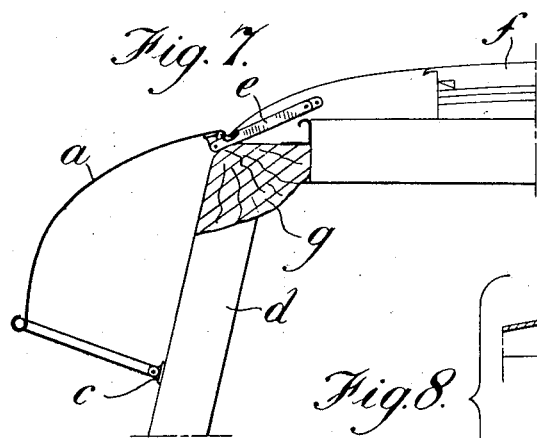
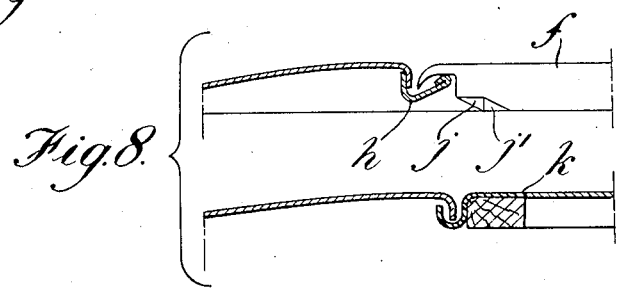
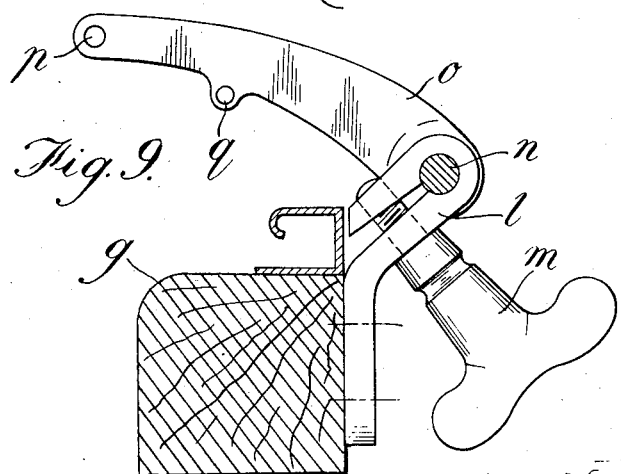
Inventor
William Henry Bishop
By Arthur Wm McLean
Atty.

Nov. 27, 1934.   W. H. BISHOP   1,981,897
BODY FOR MOTOR VEHICLES
Filed July 9, 1932   4 Sheets-Sheet 3
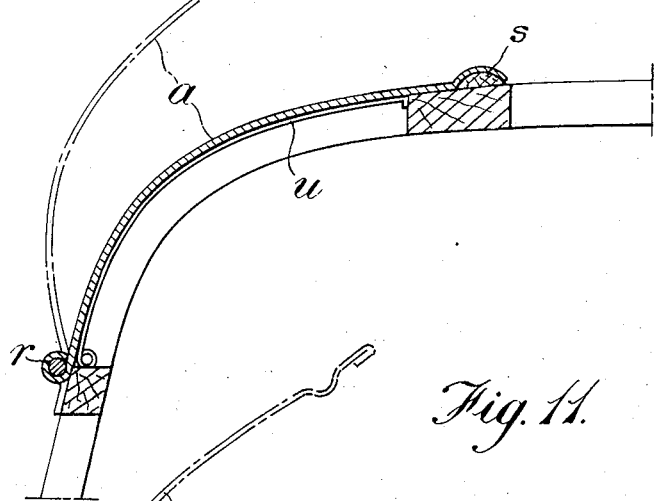
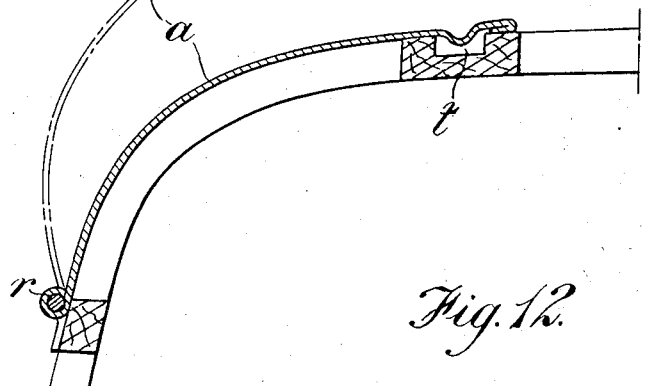
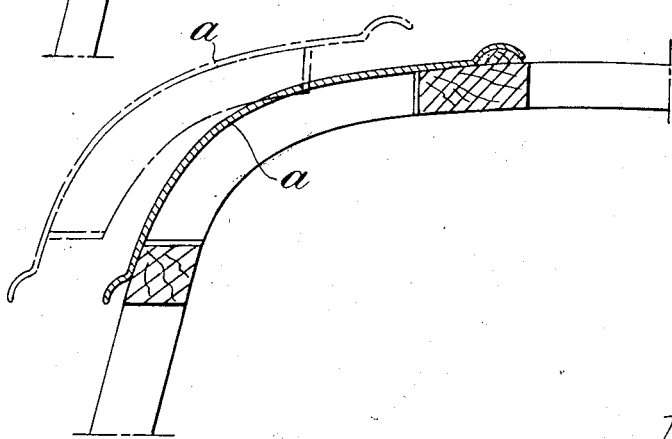
Inventor
William Henry Bishop
By Arthur Wm Nelson
Atty.

Nov. 27, 1934.   W. H. BISHOP   1,981,897
BODY FOR MOTOR VEHICLES
Filed July 9, 1932   4 Sheets-Sheet 4

Inventor
William Henry Bishop
By Arthur Wm Nelson
Atty.

Patented Nov. 27, 1934

1,981,897

UNITED STATES PATENT OFFICE 1,981,897

BODY FOR MOTOR VEHICLES

William Henry Bishop, Birmingham, England

Application July 9, 1932, Serial No. 621,589
In Great Britain October 16, 1931

8 Claims. (Cl. 296—95)

This invention relates to improvements in bodies for motor vehicles and refers particularly to bodies of the saloon type having a rigid head or roof with or without a sliding panel for an opening in the head.

It has hitherto been common practice for the head to be extended forwardly for a short distance beyond the upper edge of the windscreen to act as a canopy, and this canopy also serves to a certain extent as a visor to protect the eyes of the driver when driving in strong light or against the sun.

The presence of the canopy, however, considerably increases the wind-resistance of the vehicle when traveling fast as it traps the flow of air passing upwardly over the windscreen and sets up eddies, so that with a vehicle capable of high speeds it is desirable to omit the canopy and to merge the front end of the roof into the plane of the windscreen in a smooth curve without projections, but in that case there is no protection for the eyes of the driver against strong light or sun and if a forwardly extending sun visor of the ordinary type is fitted the benefits of the omission of the canopy are lost.

One object of my invention is to provide means whereby the advantages of a canopy or sun visor can be obtained when desired without increasing the normal wind resistance and which can be readily fitted to existing vehicles or incorporated in vehicles in the course of construction.

Another object is to provide a ventilator which is applicable to the front, sides or rear of a vehicle roof and can be opened to admit light or air but which when closed conforms with the normal smooth contour of the roof so that it does not detract from the appearance of the roof or increase the wind-resistance.

Another object is to provide a ventilator which can readily be applied to the front of the roof of a saloon car or of a closed driver's cab having the front end of the roof merged into the plane of the roof in a smooth curve and which can be employed to admit light or air above the driver's head without giving rise to undesirable draughts and without admitting rain.

My invention consists in providing for an opening in a curved edge of a vehicle roof a shell or cover which conforms when closed with the normal contour of the edge of the roof and is capable of being displaced bodily or swung about one edge to uncover the opening. When the shell or cover is applied to the front edge of a vehicle roof it is conveniently mounted in such a way that either its rear edge can be swung upwardly or the whole shell or cover can be swung or slid forwardly into a position in which it projects over the windscreen. In the first position the shell or cover lies in an upwardly and rearwardly inclined position in which it will deflect upwardly air passing over it and will set up a powerful extractor effect which draws air from the interior of the vehicle through the opening. The shell or cover can be used in this position even in heavy rain as the air current will carry the rain drops over the opening, and one is thus able to obtain adequate ventilation when driving under conditions which would make it impossible to open a sliding roof. If desired, the rear edge of the cover when closed may extend for a substantial distance behind the rear edge of the opening or over the front edge of a sliding roof panel if one is fitted. When the cover is used in conjunction with a sliding roof panel it substantially increases the length of the maximum effective opening, and the upward deflection of the air by the cover prevents any risk of downdraughts entering the vehicle through the rear part of the roof opening when the panel is in its rearmost position.

When the cover is in its second or forwardly projected position it acts as a very effective canopy and sun visor. In this position its rear edge may fit closely against the fixed front crossmember of the roof or may be spaced from it so that air passing up over the windscreen may flow between the cover and the roof and a minimum amount of wind resistance is offered.

In its closed position the cover does not detract in any way from the normal smooth contour of the windscreen and roof so that it does not set up eddies or increase the wind resistance.

When the movable cover is applied to the sides or rear of a vehicle roof it will usually be arranged so that its lower edge is carried on fixed pivots about which the cover can swing and this construction may also be employed for the front where a sun visor is not required. If it is desired to admit light without air a transparent panel, either fixed or movable, may be provided for the opening below the cover.

The front edge of the movable cover may extend downwardly over the upper edge of the windscreen frame and the sides of the cover may extend downwardly over the curved corners at the front end of the roof in which case the cover is conveniently pivoted on the windscreen pillar by means of integral arms extending downwardly from the cover. Alternatively the cover may be made of the same width as the sliding panel in the roof and may be slidably mounted in forward extensions of the guides or rails for the panel, the front edge of the cover when extended being supported by pivoted links from the windscreen pillars. The cover may if desired form the closure for the central part of the roof in front of the opening for the sliding panel which is made of such a length that it can follow up and fit under or abut against the rear edge of the cover in any position of the cover. Alternatively the cover may move over a fixed front part of the roof in front of the opening for the sliding panel.

The cover in any of its forms may be pressed in one piece from sheet metal and may be made in different sizes and contours so that it can be fitted without difficulty to existing bodies.

A number of practical forms of my invention are illustrated diagrammatically by way of example in the accompanying drawings in which:—

Figure 1 is a perspective view of a vehicle roof having a sliding panel and fitted with a movable cover or canopy which is shown in its position of use as a sun visor.

Figures 2, 3 and 4 are perspective views on a larger scale showing the cover or canopy respectively in the closed position, in use as a ventilator, and in use as a sun visor.

Figures 5, 6 and 7 are sectional views showing the cover or canopy in the positions corresponding to Figures 2, 3 and 4.

Figure 8 is a sectional view showing two methods of effecting a weathertight joint between the rear edge of the cover or canopy and a sliding roof panel.

Figure 9 is a side elevation of a suitable form of control for the cover or canopy.

Figures 10 and 11 are diagrammatic sectional views of two forms of pivoted ventilating cover or canopy.

Figure 12 is a similar sectional view of a cover or canopy having a plain horizontal movement.

Figure 13:
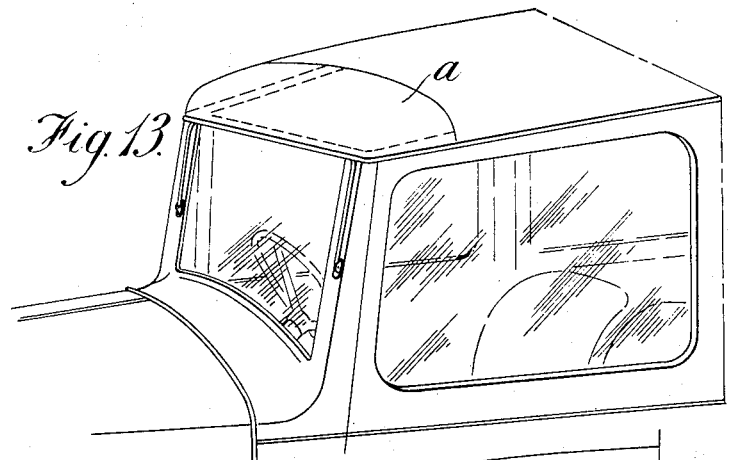
Figures 13 and 14 are respectively a perspective view and a side elevation of an alternative construction in which the whole of the front part of a vehicle roof is bodily movable.

In the arrangement illustrated in Figures 1 to 7 an opening extending across the front of the roof of a saloon car is normally closed by a cover or canopy $a$ which may be formed in one piece from sheet metal. The cover or canopy when closed conforms to the normal contour of the roof as shown in Figure 2, the front end of the roof being carried down in a smooth curve into the plane of the rearwardly inclined windscreen so that there is no obstruction to the flow of air up over the screen and roof. The front edge of the cover or canopy is pivotally mounted on a transverse rod $b$ of which the ends are downwardly cranked and pivoted in lugs $c$ on the front of the windscreen pillars $d$. To each side of the cover at or near its rear edge are connected links $e$ which are pivoted on plates mounted in the sides of the opening intermediate of its length.

In the normal closed position of the cover as shown in Figures 2 and 5 the links $e$ lie below and are concealed by the cover. When it is desired to have the opening uncovered for ventilation the rear edge of the cover is swung up on the links $e$, the front edge remaining stationary, until the cover assumes the position shown in Figures 3 and 6 or any position intermediate between that and the closed position. Air striking the windscreen will be deflected up over the rearwardly inclined cover so that air will be drawn out of the interior of the vehicle through the opening and adequate ventilation will be provided without risk of draught. This condition applies either with the sliding roof panel $f$ closed as shown in Figures 3 and 6 or open as shown in Figure 1.

When it is desired to bring the cover or canopy into use as a sun visor the links $e$ are thrown over into a forwardly extending position and the front edge of the cover or canopy is simultaneously carried forwardly and downwardly by the rod $b$ until the cover of canopy assumes the position shown in Figures 3 and 7 in which it extends forwardly and downwardly over the upper part of the windscreen and forms an effective visor. In this position the rear edge of the cover or canopy may be in contact with the fixed front cross-member $g$ of the roof or it may be spaced from it to allow air flowing up over the windscreen to pass under the cover or canopy.

Two methods of making a weathertight joint between the rear edge of the cover or canopy and the front of the sliding room panel $f$ are illustrated in Figure 8. In the first of these there is provided on the rear edge of the cover or canopy a transverse channel $h$ into which fits an overhanging lip on the front edge of the panel, and wedge blocks $j$ on the sides of the panel ride over fixed wedge blocks $j'$ on the guides as the panel approaches its closed position to lift the lip on the panel over the rear edge of the channel. In the second a downwardly cranked lip or flange $k$ on the rear edge of the cover or canopy fits, when the cover or canopy is closed, into a transverse channel strip which may be carried either by the front cross-member of a sliding panel or by a cross-member of a fixed roof. Where this latter construction is employed in conjunction with a sliding panel it permits the cover or canopy to be opened without disturbing the sliding panel.

Any convenient means may be provided for operating the cover or canopy and holding it in various positions. In the arrangement illustrated in Figure 9 a split lug $l$ secured in a central position on the front cross-member $g$ is adapted to be closed by a thumb-screw $m$ to grip a short spindle $n$ in transverse alignment with the fixed pivots of the links $e$. The spindle $n$ carries an arm $o$ of the same length as the links $e$ and this is pivotally connected at $p$ to the cover or canopy in transverse alignment with the connections of the links. A transverse rod $q$ on the arm serves as a handle for operating the cover or canopy, and by means of the thumb-screw $m$ the cover or canopy can be clamped in any desired position.

In Figures 10 and 11 are illustrated covers or canopies which serve as ventilators only. They are carried on fixed pivots $r$ at their lower edges and by links at or near their rear edges. In Figure 10 the rear edge of the cover or canopy is shown as having a transverse inverted channel fitting over a packing strip $s$ on the roof, while in Figure 11 it is shown as having a transverse channel fitting into a groove $t$ in the roof to make a weathertight joint.

In any of the forms of my invention already described a fixed or movable panel of celluloid or other transparent or translucent material may be provided for the opening below the cover or canopy so that when the cover or canopy is opened light will be admitted but not air. Such a celluloid panel is shown at $u$ in Figure 10.

In Figure 12 a cover or canopy having a plain forwardly sliding movement is shown, the cover or canopy being carried by any suitable form of sliding guides.

Figure 14:
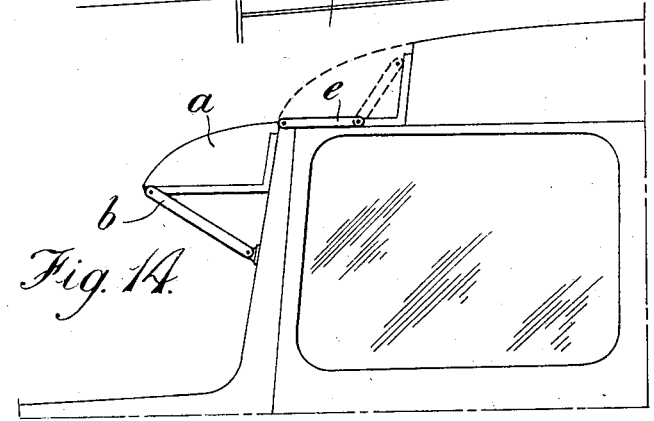

In Figures 13 and 14 is illustrated a construction in which the cover or canopy extends for the full width of the roof and includes the curved front corners of the roof, the mounting being substantially the same as that described with reference to Figures 1 to 7.

Figure 15:
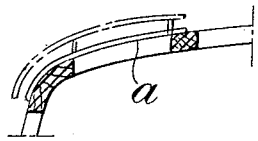
Figure 15 is a sectional side elevation of a cover or canopy which is movable vertically.

In Figure 15 is illustrated a ventilating cover or canopy having a vertical rising and falling movement on suitable guides.

Figure 16:
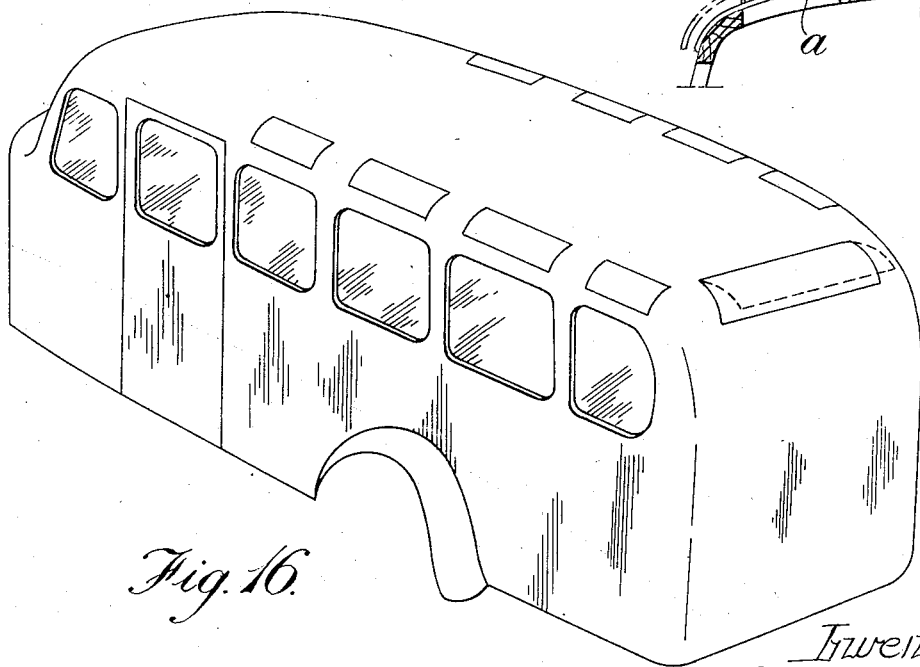
Figure 16 is a perspective view of a motor-coach body fitted with ventilators in accordance with my invention at the rear and sides of the roof.

Figure 16 shows the application of ventilating covers or canopies in accordance with my invention to the sides and rear end of the roof of a motor-coach. These may be mounted in the manner described with reference to Figures 10 and 11 or they may be hinged along their upper edges so that when opened their lower edges swing upwardly and outwardly as shown in dotted lines in connection with the rear cover or canopy in Figure 16.

I claim:

1. A sun visor for a vehicle body comprising a curved front edge of the roof merging smoothly into the plane of the windscreen, and a cover fitting over said curved edge and conforming when in one position with the normal contour of said curved edge, means for operatively connecting the front and rear margins of the cover with said body and about which said cover may be swung forwardly from said one position into another position in which it extends forwardly above the upper part of the windscreen.

2. Means for ventilating a vehicle body and forming a sun visor comprising a curved front edge of the roof merging smoothly into the plane of the windscreen, an opening in said curved edge, a cover fitting over said opening and conforming when closed with the contour of said curved edge, means for swinging the rear edge of said cover upwardly and forwardly and means for moving the front edge of said cover forwardly and downwardly.

3. Means for ventilating a vehicle body and forming a sun visor comprising a curved front edge of the roof merging smoothly into the plane of the windscreen, an opening in said curved edge, a movable cover fitting over said opening and conforming when closed with the contour of said curved edge, arms pivoted on the windscreen pillars carrying the front end of said cover, and links pivoted in the sides of the opening carrying the rear end of said cover.

4. Means for ventilating a vehicle body and forming a sun visor comprising in combination with the curved front portion of the roof merging smoothly into the plane of the windscreen of the body, there being a longitudinal opening in the roof extending forwardly into said curved portion, means for closing said opening and comprising a panel for the rear part of said opening, and a cover member for the front part of said opening conforming when closed with the contour of the curved front portion of the roof, means providing for a longitudinal slidable movement for said panel to uncover the rear part of said opening, means providing a hinged connection for said cover member whereby the same may be moved into a position uncovering the front part of said opening to form either a visor or a wind deflector and means for making a weathertight joint between said cover member and said panel when they are in a position coacting to close said opening.

5. Means for ventilating a vehicle body and forming a sun visor comprising in combination with the curved front portion of the roof merging smoothly into the plane of the windscreen of the body, there being an opening in said curved portion, an inner movable cover of translucent material for said opening, and means providing an outer movable cover for said opening, a part of said means providing said outer cover being capable of movement into a position in which it projects forwardly over the upper part of the windscreen and forms a sun visor.

6. Means for ventilating a vehicle body comprising a roof having a curved front portion emerging smoothly into the plane of the front wall of the body, there being an opening in said curved front portion, a cover fitting over said opening and conforming when closed with the contour of said curved front portion, and means connecting said cover to said roof to permit said cover to be displaced bodily forward to uncover said opening and form a sun visor for the vehicle.

7. Means for ventilating a vehicle body and forming a sun visor therefor comprising in combination with a windscreen, a roof having a curved front portion merging smoothly into the plane of the windscreen, there being an opening in said curved front portion, a cover fitting over said opening and conforming when closed with the contour of said curved front portion, linkage connecting a part of said cover to said roof, and means connecting a second part of said cover with said body, said linkage being operable to swing said cover upwardly about a portion of said last mentioned means to form a ventilator, which deflects air over said opening, and said linkage and said last mentioned means cooperating to permit said cover to be moved bodily forward into a position above the windscreen to form a sun visor associated with the windscreen.

8. In combination with a vehicle body including a windscreen and a roof having a downwardly and forwardly curved front portion merging into the plane of the windscreen, a cover curved to conform to said front portion of the roof and normally overlying the same, and means for operatively connecting said cover to said body so that said cover may be moved forwardly from a position overlying said roof portion, into a position in which it projects forwardly above the upper part of the windscreen to form a visor therefor.

WILLIAM HENRY BISHOP.